(12) United States Patent
Okada

(10) Patent No.: US 7,602,100 B2
(45) Date of Patent: Oct. 13, 2009

(54) DRIVING METHOD AND DRIVING DEVICE FOR STANDING-WAVE-TYPE ULTRASONIC ACTUATOR

(75) Inventor: Junji Okada, Tokyo (JP)

(73) Assignee: Olympus Corporation, Tokyo (JP)

( * ) Notice: Subject to any disclaimer, the term of this patent is extended or adjusted under 35 U.S.C. 154(b) by 141 days.

(21) Appl. No.: 11/958,829

(22) Filed: Dec. 18, 2007

(65) Prior Publication Data
US 2008/0164783 A1 Jul. 10, 2008

(30) Foreign Application Priority Data
Jan. 5, 2007 (JP) ............................. 2007-000770

(51) Int. Cl.
H02N 2/00 (2006.01)
H01L 41/09 (2006.01)
(52) U.S. Cl. .................... 310/316.02; 310/317
(58) Field of Classification Search ............ 310/316.01, 310/316.02, 317, 323.01–323.19, 323.21; H01L 41/09; H02N 2/00
See application file for complete search history.

(56) References Cited

U.S. PATENT DOCUMENTS
7,119,476 B2 * 10/2006 Nagahama ............. 310/323.16
7,466,062 B2 * 12/2008 Sakatani et al. ........ 310/323.16

FOREIGN PATENT DOCUMENTS
JP 2002-199749 7/2002

* cited by examiner

Primary Examiner—Walter Benson
Assistant Examiner—Karen B Addison
(74) Attorney, Agent, or Firm—Scully, Scott, Murphy & Presser, P.C.

(57) ABSTRACT

The invention provides a driving method and driving device for a standing-wave-type ultrasonic actuator which can prevent falling of and eliminate unstable motion of a driven body during activation, and which can shorten the time for the driven body to stop moving when driving is to be stopped. In the driving method for a standing-wave-type ultrasonic actuator, by generating a longitudinal vibration and a flexural vibration in an ultrasonic vibrator, a substantially elliptical vibration is produced at a friction-contact member of the ultrasonic vibrator, and with a frictional force of the elliptical vibration serving as a propulsive force, the ultrasonic vibrator and a driven body in contact with the ultrasonic vibrator are made to move relative to each other. The longitudinal vibration is excited at activation time, and the flexural vibration is excited thereafter.

6 Claims, 9 Drawing Sheets

LONGITUDINAL VIBRATION

LONGITUDINAL VIBRATION + FLEXURAL VIBRATION

DRIVING METHOD AND DRIVING DEVICE FOR STANDING-WAVE-TYPE ULTRASONIC ACTUATOR

BACKGROUND OF THE INVENTION

1. Field of the Invention

The present invention relates to a driving method and a driving device for a standing-wave-type ultrasonic actuator.

This application is based on Japanese Patent Application No. 2007-000770, the content of which is incorporated herein by reference.

2. Description of Related Art

Recently, ultrasonic motors have been drawing attention as a new type of motor replacing electromagnetic motors. Ultrasonic motors have the following advantages over known electromagnetic motors:

1) Ultrasonic motors are capable of high torque without using gears;
2) Ultrasonic motors have holding force when powered off;
3) Ultrasonic motors have high resolution;
4) Ultrasonic motors are quiet; and
5) Ultrasonic motors do not generate magnetic noise and are unaffected by noise.

Ultrasonic motors are classified into traveling-wave-type ultrasonic motors and standing-wave-type ultrasonic motors based on the principle of wave propagation. As one example of an ultrasonic motor in the related art, Japanese Unexamined Patent Application, Publication No. 2002-199749 discloses a traveling-wave-type ultrasonic motor. In Japanese Unexamined Patent Application, Publication No. 2002-199749, sound generation is reduced when activating and when stopping the device by gradually changing a phase difference between AC driving voltages when going from a standing wave to a traveling wave during activation of the ultrasonic motor, and when going from a traveling wave to a standing wave when stopping the ultrasonic motor.

BRIEF SUMMARY OF THE INVENTION

However, in the traveling-wave-type ultrasonic motor disclosed in Japanese Unexamined Patent Application, Publication No. 2002-199749, because the driving torque during activation and stopping is small, the frictional force between a vibrator and a driven body is consequently reduced. When such an activation method and driving method are applied to a standing-wave-type ultrasonic motor, there is a problem in that, during activation, the driven body falls due to the effect of gravity because the static friction between the vibrator and the driven body is reduced. In addition, when stopping driving, there is also a problem in that it takes time for the driven body to stop moving if the inertial force is large.

The present invention has been conceived in light of the circumstances described above, and an object thereof is to provide a driving method and a driving device for a standing-wave-type ultrasonic actuator which can prevent falling and eliminate unstable motion of a driven body during activation and which can shorten the time until the driven body stops moving when driving is to be stopped.

In order to solve the problems described above, the present invention employs the following solutions.

A first aspect of the present invention is a driving method for a standing-wave-type ultrasonic actuator in which, by generating a longitudinal vibration and a flexural vibration in an ultrasonic vibrator, a substantially elliptical vibration is produced at an output end of the ultrasonic vibrator, and with a frictional force of the elliptical vibration serving as a propulsive force, the ultrasonic vibrator and a driven body in contact with the ultrasonic vibrator are made to move relative to each other. The longitudinal vibration is excited at activation time, and the flexural vibration is excited thereafter.

According to the first aspect, when activating the standing-wave-type ultrasonic actuator, first only the longitudinal vibration is excited in the ultrasonic vibrator. Because static friction acts between the ultrasonic vibrator and the driven body, the driven body remains stationary. Then, when the flexural vibration is excited, an elliptical vibration composed of the longitudinal vibration and the flexural vibration is generated at the output end of the ultrasonic vibrator, and the ultrasonic vibrator rises due to this elliptical vibration. As a result, the static friction between the ultrasonic vibrator and the driven body decreases, and the driven body starts to move due to the propulsive force of the longitudinal vibration.

With the driving method of the standing-wave-type ultrasonic actuator of the first aspect described above, because the motion of the driven body is reduced by the action of the static frictional force when only the longitudinal vibration is excited, it is possible to prevent the driven body from falling due to the effect of gravity. Also, by keeping the driven body stationary and exciting the flexural vibration when the propulsive force due to the longitudinal vibration becomes sufficiently large, it is possible to eliminate unstable motion of the driven body, for example, moving backwards, until the elliptical vibration grows.

A second aspect of the present invention is a driving method for a standing-wave-type ultrasonic actuator in which, by generating a longitudinal vibration and a flexural vibration in an ultrasonic vibrator, a substantially elliptical vibration is produced at an output end of the ultrasonic vibrator, and with a frictional force of the elliptical vibration serving as a propulsive force, the ultrasonic vibrator and a driven body in contact with the ultrasonic vibrator are made to move relative to each other. The flexural vibration is stopped when driving is to be stopped, and the longitudinal vibration is stopped thereafter.

According to the second aspect, when stopping driving of the standing-wave-type ultrasonic actuator, the flexural vibration is stopped first. Accordingly, the elliptical vibration generated at the output end of the ultrasonic vibrator rapidly vanishes, and the rising of the ultrasonic vibrator is reduced. As a result, the frictional force between the ultrasonic vibrator and the driven body becomes large, and therefore, it is possible to suppress the motion of the driven body. In addition, by the expansion and compression of the ultrasonic vibrator in the direction of motion due to the longitudinal vibration excited therein, it is possible to reduce the inertial force acting on the driven body.

With the driving method for the standing-wave-type ultrasonic actuator of the second aspect described above, because the longitudinal vibration is stopped while the frictional force is applied to the driven body and the inertial force of the driven body is reduced, it is possible to shorten the stopping time of the driven body (the time from when the driving signals stop being applied to the ultrasonic vibrator until the driven body stops moving).

A third aspect of the present invention is a driving device for a standing-wave-type ultrasonic actuator in which, by generating a longitudinal vibration and a flexural vibration in an ultrasonic vibrator, a substantially elliptical vibration is produced at an output end of the ultrasonic vibrator, and with a frictional force of the elliptical vibration serving as a propulsive force, the ultrasonic vibrator and a driven body in contact with the ultrasonic vibrator are made to move relative to each other. The driving device excites the longitudinal vibration at activation time and excites the flexural vibration thereafter.

According to the third aspect, when activating the standing-wave-type ultrasonic actuator, first only the longitudinal vibration is excited in the ultrasonic vibrator. Because static friction acts between the ultrasonic vibrator and the driven body, the driven body remains stationary. Then, when the flexural vibration is excited, an elliptical vibration composed of the longitudinal vibration and the flexural vibration is generated at the output end of the ultrasonic vibrator, and the ultrasonic vibrator rises due to this elliptical vibration. As a result, the static friction between the ultrasonic vibrator and the driven body decreases, and the driven body starts to move due to the propulsive force of the longitudinal vibration.

With the standing-wave-type ultrasonic actuator of the third aspect described above, the motion of the driven body is reduced by the action of the static frictional force when only the longitudinal vibration is excited. Therefore, it is possible to prevent the driven body from falling due to the effect of gravity. Also, by keeping the driven body stationary and exciting the flexural vibration when the propulsive force due to the longitudinal vibration becomes sufficiently large, it is possible to eliminate unstable motion of the driven body, for example, moving backwards, until the elliptical vibration grows.

A fourth aspect of the present invention is a driving device for a standing-wave-type ultrasonic actuator in which, by generating a longitudinal vibration and a flexural vibration in an ultrasonic vibrator, a substantially elliptical vibration is produced at an output end of the ultrasonic vibrator, and with a frictional force of the elliptical vibration serving as a propulsive force, the ultrasonic vibrator and a driven body in contact with the ultrasonic vibrator are made to move relative to each other. The flexural vibration is stopped when the driving is to be stopped, and the longitudinal vibration is stopped thereafter.

According to the fourth aspect, when stopping driving of the standing-wave-type ultrasonic actuator, the flexural vibration is stopped first. Accordingly, the elliptical vibration generated at the output end of the ultrasonic vibrator rapidly vanishes, and the rising of the ultrasonic vibrator is reduced. As a result, the frictional force between the ultrasonic vibrator and the driven body becomes large, and therefore, it is possible to reduce the motion of the driven body. In addition, by expansion and compression of the ultrasonic vibrator in the direction of motion due to the longitudinal vibration excited therein, it is possible to reduce the inertial force acting on the driven body.

With the standing-wave-type ultrasonic actuator of the fourth aspect described above, because the longitudinal vibration is stopped while the frictional force is applied to the driven body and the inertial force of the driven body is reduced, it is possible to shorten the stopping time of the driven body (the time from when the driving signals stop being applied to the ultrasonic vibrator until the driven body stops moving).

A fifth embodiment of the present invention is a standing-wave-type ultrasonic actuator system including a standing-wave-type ultrasonic actuator; and the driving device described above.

The present invention affords an advantage in that, when activating a standing-wave-type ultrasonic actuator, it is possible to prevent falling of and to stabilize the motion of a driven body. The present invention also affords an advantage in that, when stopping driving of the standing-wave-type ultrasonic actuator, it is possible to shorten the time for the driven body to stop moving.

DETAILED DESCRIPTION OF THE INVENTION

A driving method and driving device of a standing-wave-type ultrasonic actuator (hereinafter simply referred to as "ultrasonic actuator") according to an embodiment of the present invention are described below with reference to the drawings.

Figure 1:
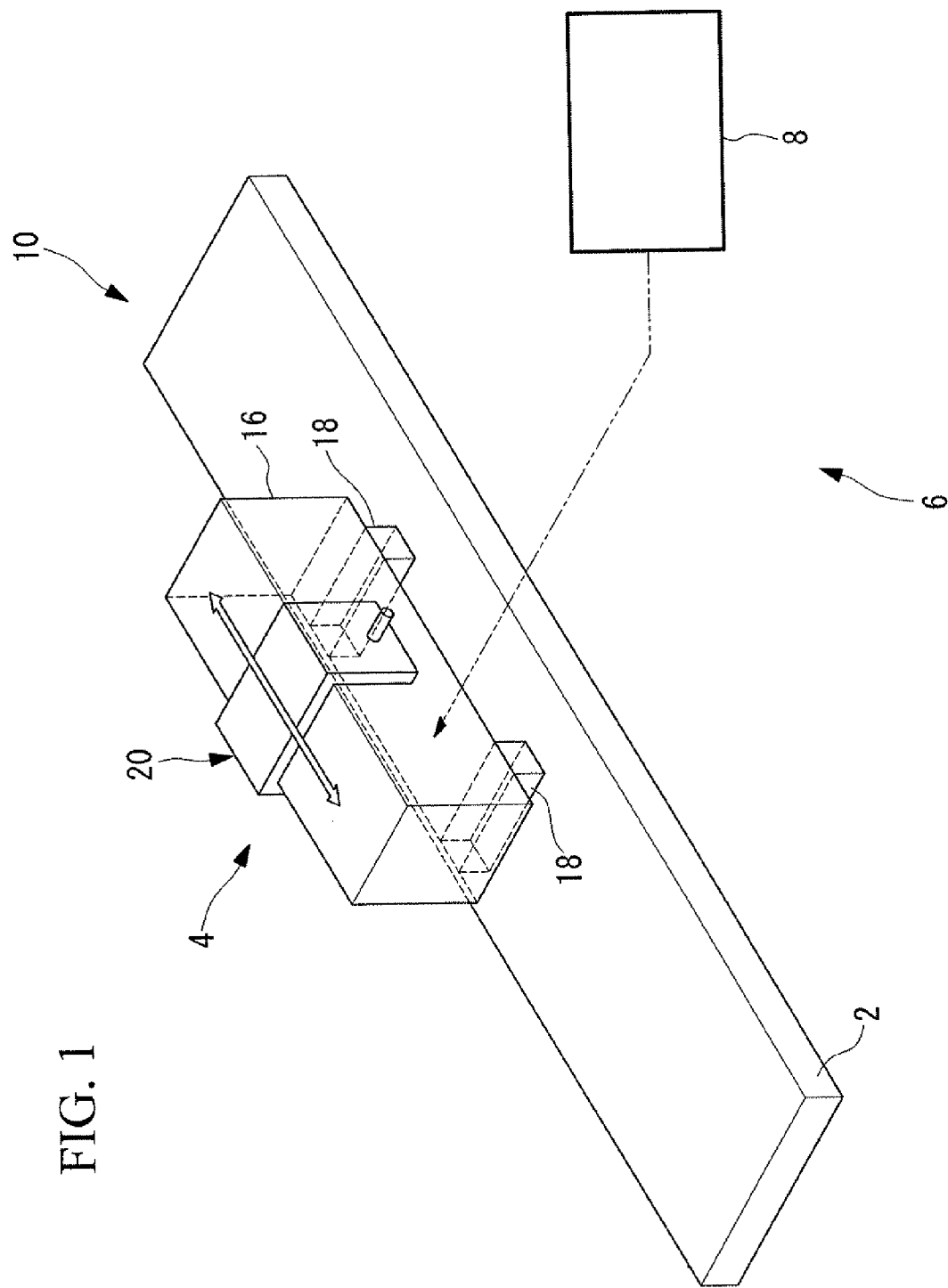
FIG. 1 is diagram showing, in outline, the overall configuration of an ultrasonic actuator according to an embodiment of the present invention.

As shown in FIG. 1, an ultrasonic actuator 10 according to this embodiment includes a driven body 2 and an ultrasonic vibrator 4 disposed in contact with the driven body 2. The ultrasonic vibrator 4 is pressed against the driven body 2 with a prescribed pressing force by pressing part, which is not shown in the drawing. An ultrasonic-actuator system 6 according to this embodiment includes the ultrasonic actuator 10 described above and a driving device 8 for driving the ultrasonic actuator 10.

Figure 2:
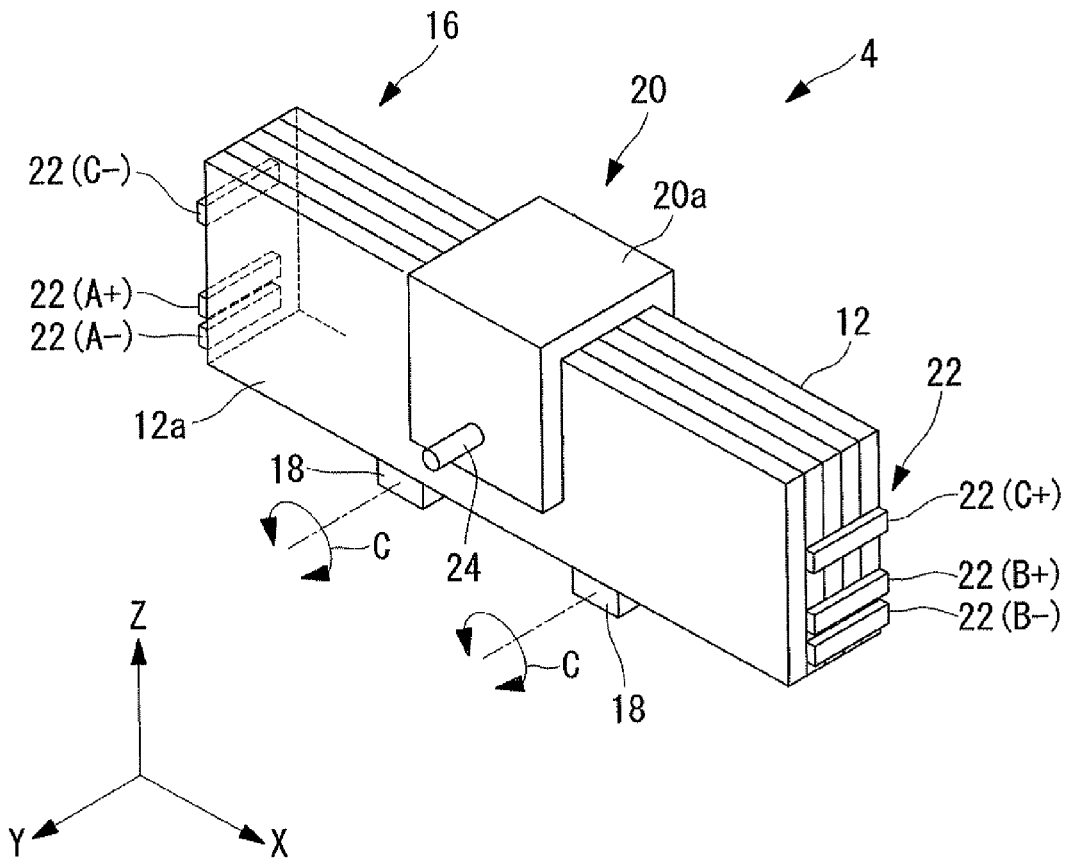
FIG. 2 is a diagram showing, in outline, an ultrasonic vibrator constituting the ultrasonic actuator in FIG. 1.
Figure 3:
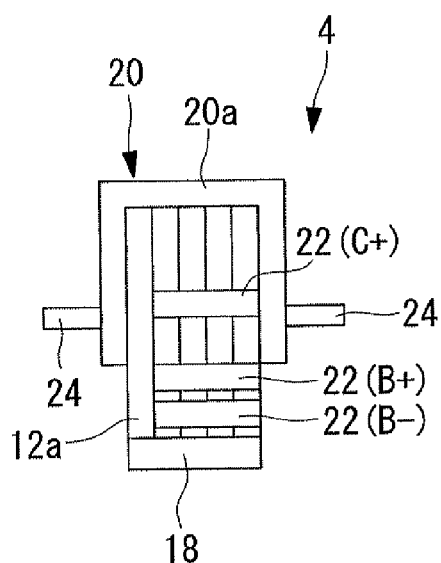
FIG. 3 is a diagram showing, in outline, the ultrasonic vibrator in FIG. 2 taken from another angle.

As shown in FIGS. 2 and 3, the ultrasonic vibrator 4 includes, for example, a rectangular-block-shaped piezoelectric layered member 16, two friction-contact members 18, and a vibrator holding member 20. The piezoelectric layered member 16 is made up of a stack of rectangular piezoelectric ceramic sheets 12, each provided with internal electrodes 14 in the form of a sheet on one side thereof (see FIGS. 4 and 5). The friction-contact members 18 are bonded to two output ends formed on one side of the piezoelectric layered member 16, in the width direction thereof.

As shown in FIG. 2, the outer dimensions of the piezoelectric layered member 16 are, for example, a length of 20 mm, a width of 5.0 mm, and a thickness of 3.2 mm. The piezoelectric ceramic sheets 12 constituting the piezoelectric layered member 16 are, for example, lead zirconate titanate (hereinafter referred to as PZT) piezoelectric ceramic elements having a thickness of about 80 μm. For the PZT, it is preferable to use a hard-type PZT having a large Qm value. The Qm value is about 1,800.

Figure 4:
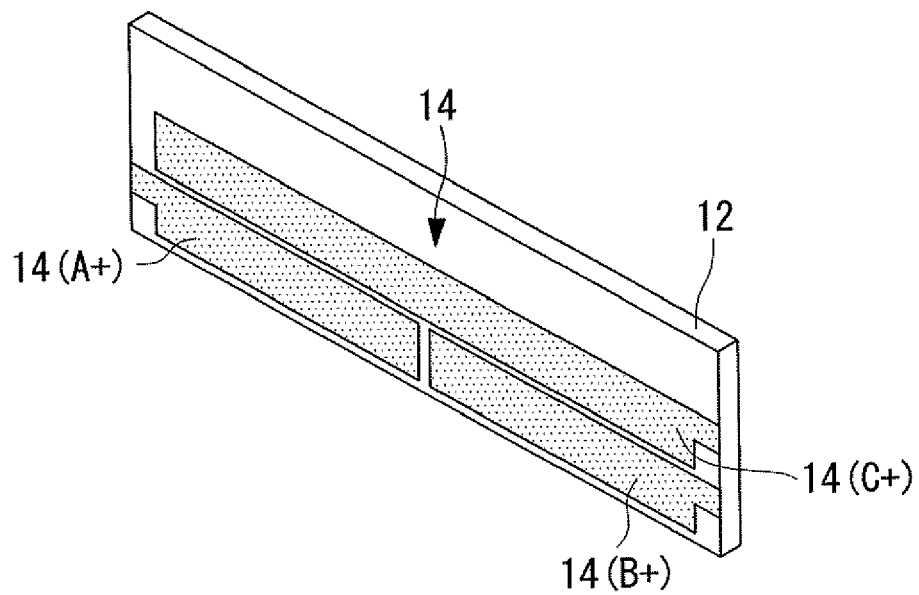
FIG. 4 is a perspective view showing a piezoelectric ceramic sheet constituting the ultrasonic vibrator in FIG. 2.
Figure 5:
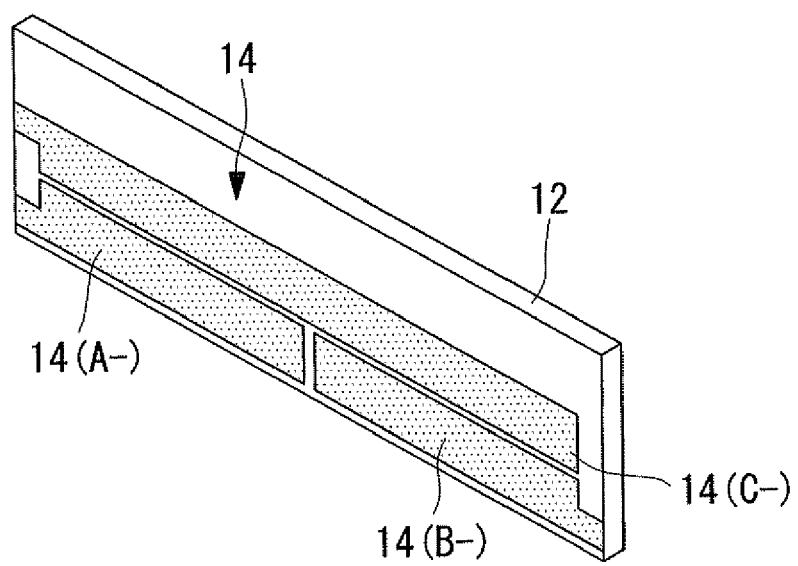
FIG. 5 is a perspective view showing a piezoelectric ceramic sheet constituting the ultrasonic vibrator in FIG. 2.

As shown in FIGS. 4 and 5, the internal electrodes 14 are composed of, for example, silver-palladium alloy and have a thickness of about 4 μm. A piezoelectric ceramic sheet 12a (see FIGS. 2 and 3) disposed at one end in the layering direction does not have any internal electrodes 14. The other piezoelectric ceramic sheets 12 include two different types of internal electrodes 14, as shown in FIGS. 4 and 5.

The piezoelectric ceramic sheet 12 shown in FIG. 4 includes internal electrodes 14(A+) and 14(B+) for driving and an internal electrode 14(C+) for vibration detection.

Figure 8:
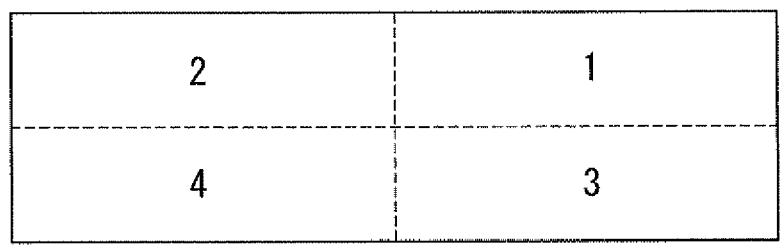
FIG. 8 is a diagram for explaining the electrical charges generated in internal electrodes provided on the piezoelectric ceramic sheet, showing the piezoelectric ceramic sheet divided into four regions.

The internal electrode 14(C+) is provided in a strip shape in the longitudinal direction of the piezoelectric ceramic sheet 12, at the center part in the width direction thereof. More specifically, when the piezoelectric ceramic sheet 12 is divided into four regions, that is, first to fourth regions, by dividing it into two equal parts in the longitudinal direction and two equal parts in the width direction, as shown in FIG. 8, the internal electrode 14(C+) is disposed so that the areas occupied in the first to fourth regions are substantially the same.

Instead of the example arrangement described above, the internal electrode 14(C+) may be disposed such that the areas occupied in two prescribed neighboring regions are substantially the same and the areas occupied in the two other neighboring regions are substantially the same. For example, it may be disposed such that it occupies the same areas in the first region and the second region, and such that it occupies the same areas in the third region and the fourth region. In this case, the areas occupied in the first region and the third region may differ. Instead of disposing the internal electrode 14(C+) over four regions, the internal electrode 14(C+) may be disposed over two neighboring regions. For example, the internal electrode 14(C+) may be disposed over the third region and the fourth region so that the areas occupied in each region are the same.

As shown in FIG. 4, the internal electrodes 14(A+) and 14(B+) for driving are disposed in line along the longitudinal direction of the piezoelectric ceramic sheet 12. In this embodiment, the internal electrode 14(A+) is disposed in the fourth region in FIG. 8, and the internal electrode 14(B+) is disposed in the third region.

Similarly, the piezoelectric ceramic sheet 12 shown in FIG. 5 includes internal electrodes 14(A−) and 14(B−) for driving and an internal electrode 14(C−) for vibration detection.

The internal electrode 14(C−) is disposed at a position corresponding to the internal electrode 14(C+) on the piezoelectric ceramic sheet 12 shown in FIG. 4. Similarly, the internal electrodes 14(A−) and 14(B−) are disposed at positions corresponding to the internal electrodes 14(A+) and 14(B+) shown in FIG. 4, respectively.

The internal electrodes 14 described above are disposed with insulating distances therebetween of about 0.4 mm in the width direction of the piezoelectric ceramic sheet 12, and insulating distances therebetween of about 0.4 mm in the longitudinal direction of the piezoelectric ceramic sheet 12. A portion of each of the internal electrodes 14 extends to the edge of the piezoelectric ceramic sheet 12 and is connected to an external electrode 22 which is described later (see FIGS. 2 and 3).

The internal electrodes 14(C+) and 14(C−) provided in the form of strips at the center of the piezoelectric ceramic sheets 12 have substantially the same size as each other, and the internal electrodes 14(A+), 14(B+), 14(A−), and 14(B−) have substantially the same size as each other.

The rectangular-block-shaped piezoelectric layered member 16 is constituted by alternately stacking a plurality of the piezoelectric ceramic sheets 12 shown in FIG. 4 and the piezoelectric ceramic sheets 12 shown in FIG. 5.

The external electrodes 22 are provided on the end faces in the longitudinal direction of the piezoelectric layered member 16 formed in this way for connecting the respective internal electrodes of the same type disposed on each piezoelectric ceramic sheet 12, that is, for connecting all of the internal electrodes 14(A+), all of the internal electrodes (14A−), all of the internal electrodes 14(B+), all of the internal electrodes 14(B−), all of the internal electrodes 14(C+), and all of the internal electrodes 14(C−).

More concretely, as shown in FIGS. 2 and 3, at one end in the longitudinal direction of the piezoelectric layered member 16, a C-phase external electrode 22(C+) and B-phase external electrodes 22(B+) and 22(B−) are provided in this order from the other face (the top in the figure) of the piezoelectric layered member 16, and at the opposite end, a C-phase external electrode 22(C−) and A-phase external electrodes 22(A+) and 22(A−) are provided.

The A-phase external electrodes 22 and the B-phase external electrodes 22 are external electrodes for driving, and the C-phase external electrodes 22 are external electrodes for vibration detection. A wiring line is connected to each external electrode 22 (see FIG. 11). These wiring lines may be any type of wiring lines having flexibility, such as leads or flexible substrates.

Figure 11:
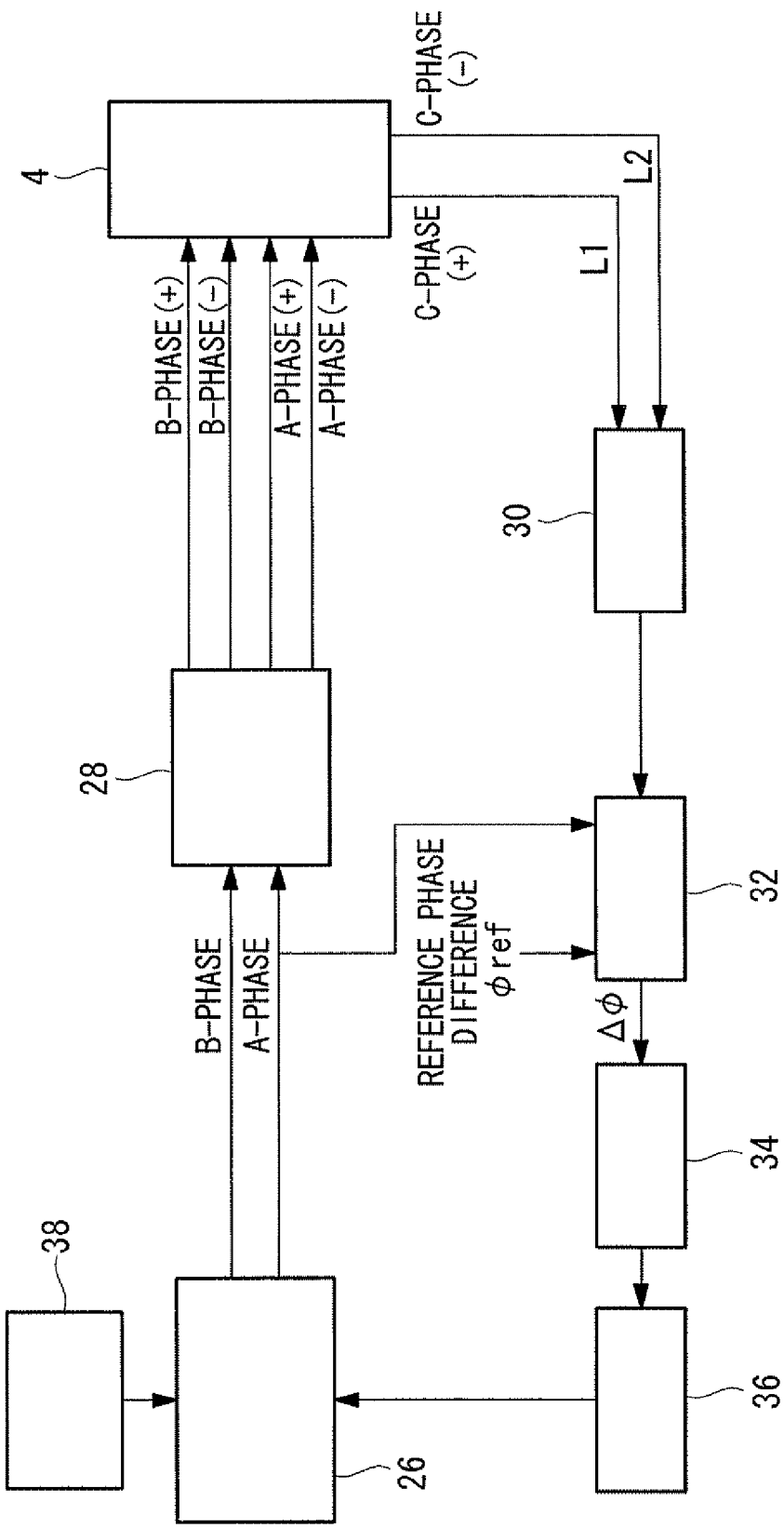
FIG. 11 is a block diagram showing, in outline, the configuration of an ultrasonic actuator driving device according to an embodiment of the present invention.

More specifically, as shown in FIG. 11, a pair of wiring lines respectively connected to the A-phase external electrodes 22(A+) and 22(A−) are connected to a drive IC 28 of the driving device 8 as A-phase driving signal lines. Similarly, a pair of wiring lines respectively connected to the B-phase external electrodes 22(B+) and 22(B−) are connected to the drive IC 28 of the driving device 8 as B-phase driving signal lines.

As shown in FIG. 11, a wiring line L1 connected to the C-phase external electrode 22(C+) of the ultrasonic vibrator 4 and a wiring line L2 connected to the C-phase external electrode 22(C−) of the ultrasonic vibrator 4 are connected to a vibration detection circuit 30 of the driving device 8.

Next, the operation of the piezoelectric layered member 16 configured in this way will be described.

Figure 6:
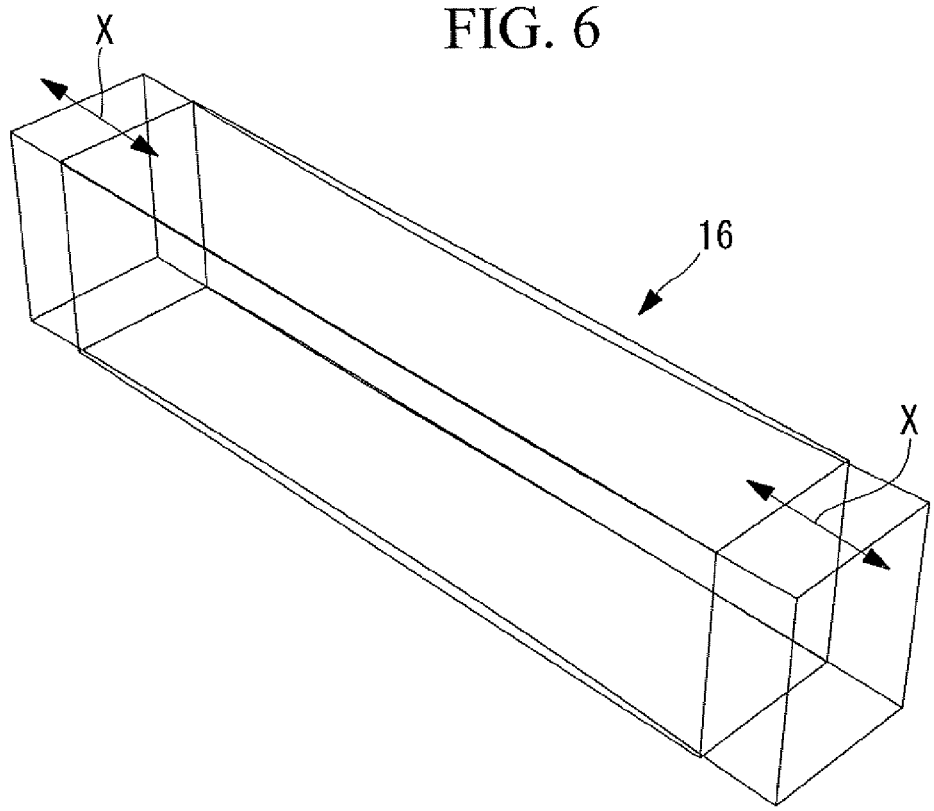
FIG. 6 is a diagram, obtained by computer analysis, showing a piezoelectric layered member in FIG. 2 oscillating in a first-order longitudinal vibration.
Figure 9:
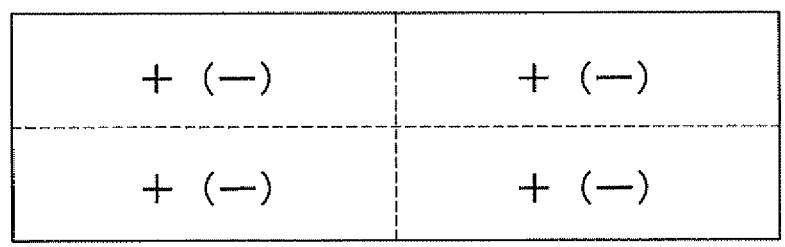
FIG. 9 is a diagram showing the electrical charges excited in each region shown in FIG. 8 when the longitudinal vibration is excited.

When AC driving voltages corresponding to the resonance frequency are applied to the A-phase external electrodes 22(A+) and 22(A−) and to the B-phase external electrodes 22(B+) and 22(B−) with the same phase, a first-order longitudinal vibration is excited, as shown in FIG. 6. Regarding the electrical charges generated in the above-described piezoelectric ceramic sheets 12 at this time, when the piezoelectric ceramic sheets 12 are divided into four regions, as shown in FIG. 8 for instance, positive electrical charges or negative electrical charges are simultaneously excited in the first to fourth regions, as shown in FIG. 9.

Figure 7:
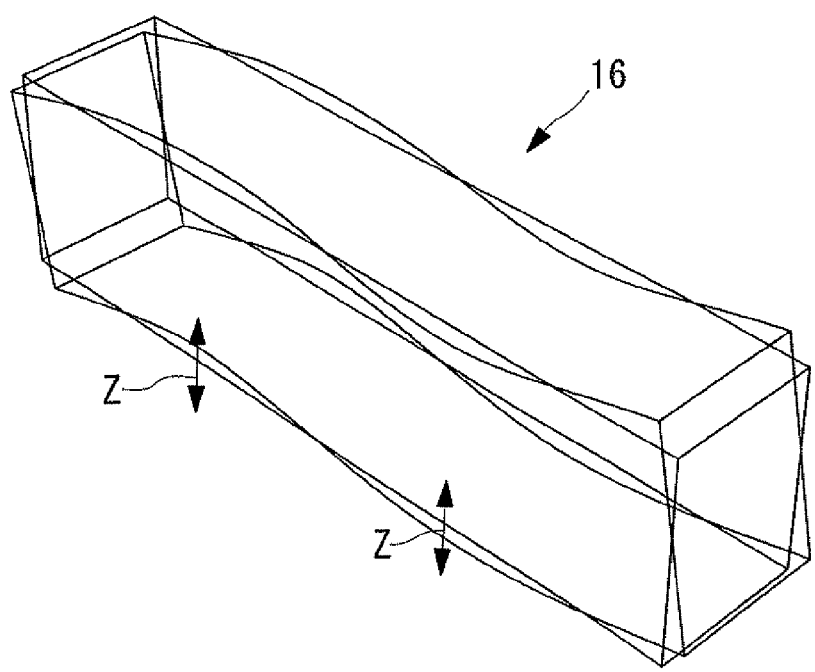
FIG. 7 is a diagram, obtained by computer analysis, showing the piezoelectric layered member in FIG. 2 oscillating in a second-order flexural vibration.
Figure 10:
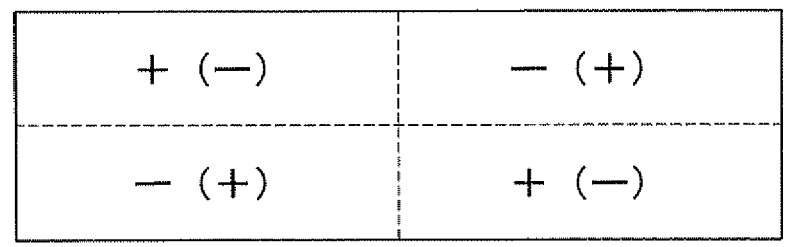
FIG. 10 is a diagram showing the electrical charges excited in each region shown in FIG. 8 when the flexural vibration is excited.

When AC driving voltages corresponding to the resonance frequency are applied to the A-phase external electrodes 22(A+) and 22(A−) and to the B-phase external electrodes 22(B+) and 22(B−) with opposite phases, a second-order flexural vibration is excited, as shown in FIG. 7. At this time, the electrical charges in each region are as shown in FIG. 10. In other words, when the flexural vibration is excited, among the first to fourth regions shown in FIG. 8, electrical charges of the same sign are simultaneously excited in pairs of regions located on diagonal lines, whereas electrical charges with different signs are simultaneously excited in pairs of neighboring regions. That is, electrical charges of the same sign are simultaneously excited in the pair formed of the first and fourth regions and in the pair formed of the second and third regions, whereas electrical charges with different signs are excited in the pair formed of the first and second regions, the pair formed of the second and fourth regions, the pair formed of the fourth and third regions, and the pair formed of the third and first regions.

Electrical charges with different signs from each other are excited in the internal electrodes 14(C+) and 14(C−) forming a pair.

Based on the above, the electrical charges due to the flexural vibration in the C-phase internal electrodes 14(C+) and 14(C−), which are disposed so as to be distributed equally over the neighboring regions, cancel each other out, and electrical charges proportional only to the longitudinal vibration are excited. Therefore, the electrical signals detected via the wiring line L1 for the C-phase external electrode 22(C+) and the wiring line L2 for the C-phase external electrode 22(C−) is proportional to the longitudinal vibration. The signs of the electrical charges excited are determined by the vibration phase conditions.

Returning to FIG. 2, the friction-contact members 18 are bonded at two positions corresponding to the antinodes of the second-order flexural vibration of the piezoelectric layered member 16. Accordingly, when the first-order longitudinal vibration is generated in the piezoelectric layered member 16, the friction-contact members 18 are displaced in the longitudinal direction of the piezoelectric layered member 16 (the X direction shown in FIG. 2 and the X direction shown in FIG. 6). On the other hand, when the second-order flexural vibration is generated in the piezoelectric layered member 16, the friction-contact members 18 are shifted in the width direction of the piezoelectric layered member 16 (the Z direction shown in FIG. 2 and the Z direction shown in FIG. 7).

Therefore, by applying AC driving voltages corresponding to the resonance frequency to the A-phase external electrodes 22 and the B-phase external electrodes 22 of the ultrasonic vibrator 4, with shifted phases, a first-order longitudinal vibration and a second-order flexural vibration are simultaneously generated, and as shown by the arrows C in FIG. 2, a clockwise or counterclockwise substantially elliptical vibration is generated at the positions of the friction-contact members 18.

The friction-contact members 18 are formed of a material in which, for example, potassium titanate fibers, carbon fibers, PTFE (polytetrafluoroethylene), etc. is mixed in PPS (polyphenylene sulfide) resin.

The vibrator holding member 20 includes a holding part 20a having a substantially angular-U shape in cross section and pins 24 which are integrally attached to the holding part 20a and which project perpendicularly from both sides of the holding part 20a. The holding part 20a covers the piezoelectric layered member 16 from one side in the width direction thereof and is bonded to the piezoelectric layered member 16 with, for example, a silicone resin or an epoxy resin. When the holding part 20a is bonded to the piezoelectric layered member 16, the two pins 24 integrally provided on the sides of the holding part 20a are coaxially disposed at the position of a common node of the longitudinal vibration and the flexural vibration of the piezoelectric layered member 16.

Next, the driving device % of the ultrasonic actuator 10 according to this embodiment will be described with reference to FIGS. 11 to 16.

As shown in FIG. 11, the driving device 8 includes a driving-pulse generating circuit 26 for generating two-phase driving control signals, a drive IC 28 for generating AC driving voltages on the basis of the driving control signals output from the driving-pulse generating circuit 26, a vibration-detection circuit 30 for detecting vibration of the ultrasonic vibrator 4, a phase comparator circuit 32 for determining a phase difference between a vibration-detection signal output from the vibration-detection circuit 30 and a driving control signal generated by the driving-pulse generating circuit 26, a frequency control circuit 34 for controlling the AC driving voltages applied to the ultrasonic vibrator 4 according to this phase difference, a frequency setting circuit 36, and a direction specifying circuit 38.

Figure 12:
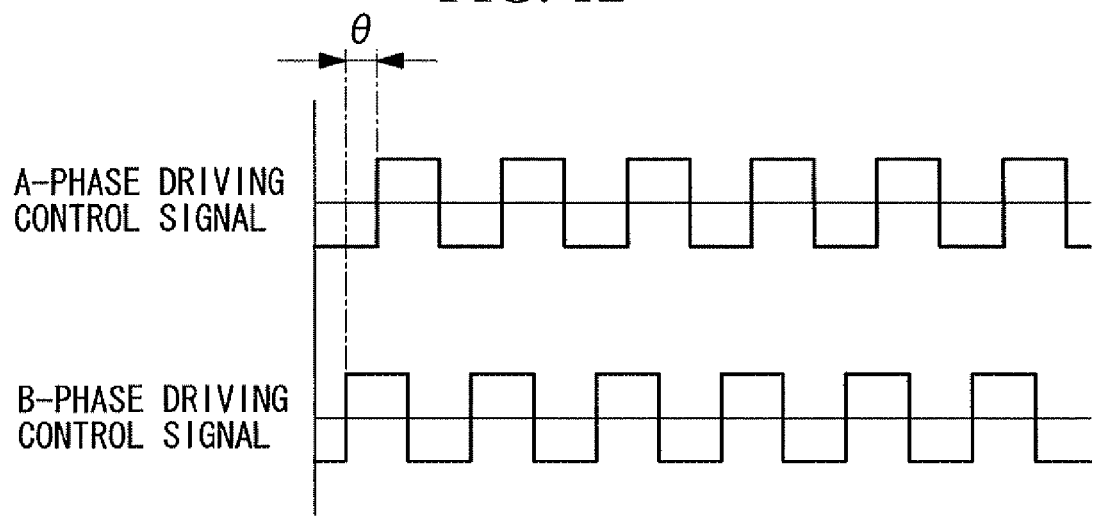
FIG. 12 is a diagram showing two-phase driving control signals generated by a driving-pulse generating circuit.

As shown in FIG. 12, the driving-pulse generating circuit 26 generates two-phase (A-phase and B-phase) driving control signals with a predetermined driving frequency and having either the same phase or a predetermined phase difference θ and outputs them to the drive IC 28. The predetermined phase difference θ is, for example, about 90°.

The drive IC 28 generates two-phase (A-phase and B-phase) AC driving voltages having the same phase or the predetermined phase difference θ and with a predetermined driving frequency on the basis of the two-phase driving control signals output from the driving-pulse generating circuit 26 and respectively applies each AC driving voltage to the A-phase external electrodes 22(A+) and 22(A−) and the B-phase external electrodes 22(B+) and 22(B−) of the ultrasonic vibrator 4 described above.

The vibration-detection circuit 30, which is connected to the C-phase external electrodes 22(C+) and 22(C−) via the wiring lines L1 and L2, generates a vibration-detection signal corresponding to the longitudinal vibration generated in the ultrasonic vibrator 4, on the basis of analog electrical signals from the C-phase external electrodes 22(C+) and 22(C−) (hereinafter referred to as "C-phase electrical signals"). More specifically, the C-phase electrical signals input via the wiring lines L1 and L2 are subjected to various types of signal processing, such as level adjustment, noise removal, and binarization, and are converted to digital signals, and the processed digital signals are output as a vibration-detection signal.

Figure 13:
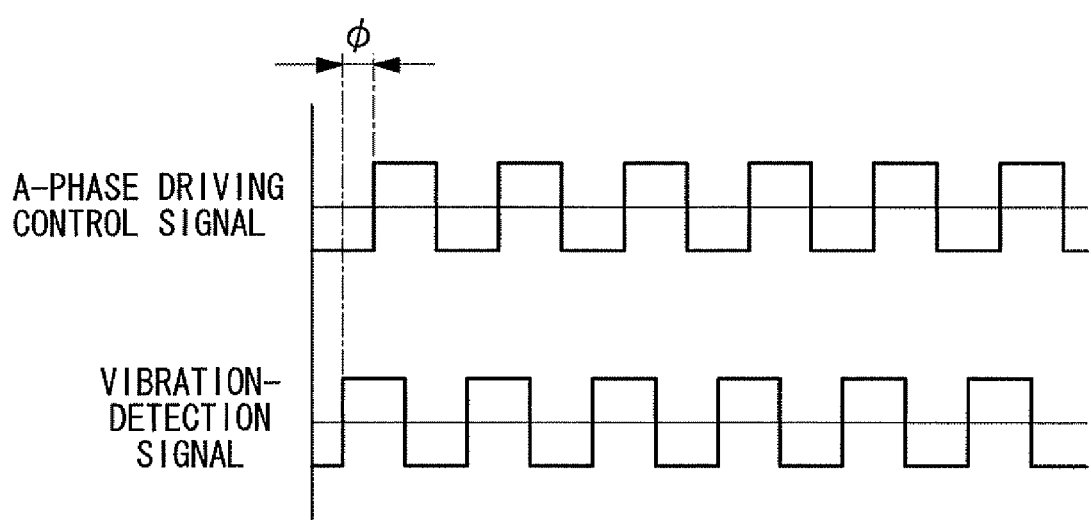
FIG. 13 is a diagram showing an A-phase driving control signal and a vibration detection signal.

The vibration-detection signal output from the vibration detection circuit 30 and the A-phase driving control signal input to the drive IC 28 are input to the phase comparator circuit 32. As shown in FIG. 13, the phase comparator circuit 32 determines the phase difference φ between the A-phase driving control signal and the vibration-detection signal, determines a difference Δφ (=φ−φref) between this phase difference φ and a reference phase difference φref which is stored in advance, and outputs a signal according to this difference Δφ.

In this embodiment, the reference phase difference φref is set to 3π/4, and the driving frequency is controlled so that the phase difference φ between the A-phase driving control signal and the vibration detection signal is always the reference phase difference 3π/4. This is because, when the phase difference φ is 3π/4, it takes the driving frequency, and it is possible to drive the ultrasonic actuator 10 in the most efficient region.

The value of the reference phase difference φref is not particularly limited; it is possible to set it to any value depending on the design, according to the driving efficiency of the ultrasonic actuator 10, that is to say, the desired speed of the actuator.

Returning to FIG. 11, the difference Δφ from the phase comparator circuit 32 is input to the frequency control circuit 34. On the basis of this difference Δφ, the frequency control circuit 34 determines a change in frequency Δf for making the difference Δφ zero and outputs this change in frequency Δf to the frequency setting circuit 36. Specifically, when the difference Δφ takes a positive value, it outputs a change +Δf for increasing the frequency by a predetermined amount, and when the difference Δφ takes a negative value, it outputs a change −Δf for decreasing the frequency by a predetermined amount. Thus, with this embodiment, sequential control is realized on the basis of the difference Δφ.

The change in frequency Δf from the frequency control circuit 34 is input to the frequency setting circuit 36. The frequency setting circuit 36 is formed, for example, of an oscillator, a divider circuit, and so forth. The frequency setting circuit 36 generates a clock signal formed by increasing and decreasing the frequency according to the change Δf from the frequency control circuit 34 and outputs it to the driving-pulse generating circuit 26 described above.

The direction-specifying signal from the direction-specifying circuit 38 is input to the driving-pulse generating circuit 26. The driving-pulse generating circuit 26 changes the phase difference θ of the two-phase driving control signals output to the drive IC 28 according to the direction-specifying signal. Accordingly, it is possible to switch the direction of the substantially elliptical vibration generated at the friction-contact members 18 of the ultrasonic vibrator 4 between positive rotation and negative rotation. As a result, it is possible to change the rotation direction of the driven body 2 in FIG. 1 to the clockwise (CW) direction or the counterclockwise (CCW) direction.

Next, the driving method of the ultrasonic actuator 10 will be described.

Figure 14:
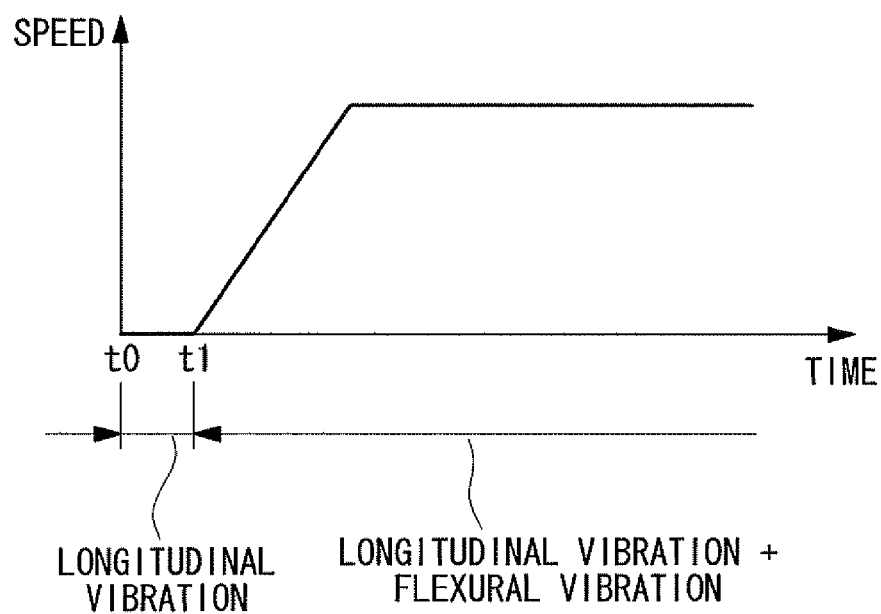
FIG. 14 is a diagram showing the relationship between vibration excitation time and moving speed of a driven body, when activating the ultrasonic actuator according to an embodiment of the present invention.

First, when the ultrasonic actuator 10 is activated, as shown in FIG. 14, the driving device 8 excites a longitudinal vibration in the ultrasonic vibrator 4, and then excites a flexural vibration.

In FIG. 14, the horizontal axis indicates time and the vertical axis indicates the moving speed of the driven body 2. In this embodiment, the longitudinal vibration is excited from t0 to t1, and both the longitudinal vibration and the flexural vibration are excited from t1 onwards.

More specifically, when activating the ultrasonic actuator 10, the two-phase driving control signals with a predetermined driving frequency and the same phase are input to the drive IC 28 from the driving-pulse generating circuit 26. Accordingly, two-phase AC driving voltages with the same phase and the predetermined driving frequency are respectively applied to the A-phase external electrodes 22(A+) and 22(A−) and the B-phase external electrodes 22(B+) and 22(B−) of the ultrasonic vibrator 4.

Figure 15A:
FIG. 15A is a diagram showing longitudinal vibration of a friction-contact member.
Figure 15B:
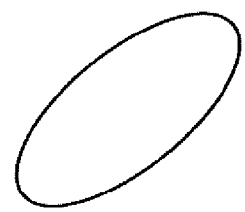
FIG. 15B is a diagram showing elliptical vibration of the friction-contact member, which is a combination of longitudinal vibration and flexural vibration.

As a result, a longitudinal vibration is excited in the ultrasonic vibrator 4, and a longitudinal vibration shown in FIG. 15A is generated at the friction-contact members 18. In this state, because static friction due to the pressing force of the pressing part (not shown) acts between the driven body 2 and the ultrasonic vibrator 4, the movement of the driven body 2 is restricted and it is kept stationary, as shown in FIG. 14.

Next, when the propulsive force due to the longitudinal vibration becomes sufficiently large, the A-phase driving control signal and the B-phase driving control signal with a phase difference θ of 90° (see FIG. 12) are generated by the driving-pulse generating circuit 26. When the A-phase driving control signal and the B-phase driving control signal with the 90° phase difference θ are applied to the ultrasonic vibrator 4, a longitudinal vibration and a flexural vibration are excited in the ultrasonic vibrator 4. Accordingly, an elliptical vibration shown in FIG. 15B due to the longitudinal vibration and the flexural vibration is generated at the tips of the friction-contact members 18, matching the growth of the flexural vibration. As a result, the ultrasonic vibrator 4 is raised, causing the static friction between the driven body 2 and the ultrasonic vibrator 4 to decrease, and therefore, the driven body 2 starts to move, as shown in FIG. 14.

As described above, when activating the ultrasonic actuator 10, because static friction acts by exciting only a longitudinal vibration, thus restricting the movement of the driven body 2, it is possible to prevent the driven body 2 from falling due to gravity. In addition, by exciting the flexural vibration when the propulsive force due to the longitudinal vibration becomes sufficiently large, while keeping the driven body 2 stationary, it is possible to eliminate unstable motion of the driven body 2, for example, moving backwards, until the elliptical vibration grows.

Then, by changing the phase difference θ between the A-phase driving control signal and the B-phase driving control signal to 90°, feedback control by the vibration detection circuit 30 etc. is started to keep the frequency of the A-phase driving control signal and the B-phase driving control signal constant at the resonance frequency.

More concretely, of the longitudinal vibration and the flexural vibration generated in the ultrasonic vibrator 4, an electrical signal according to the longitudinal vibration is input to the vibration detection circuit 30 via the wiring lines L1 and L2, is converted to a digital signal in the vibration detection circuit 30, and is input to the phase comparator circuit 32 as a vibration-detection signal.

The phase difference φ is determined by comparing the vibration-detection signal input to the phase comparator circuit 32 with the A-phase driving control signal, and then, by obtaining the difference Δφ between this phase difference φ and the reference phase difference φref, a signal according to the difference Δφ is output to the frequency control circuit 34.

The sign (plus or minus) of the change in frequency Δf is determined on the basis of the sign (plus or minus) of the difference Δφ in the frequency control circuit 34, and this change Δf is output to the frequency setting circuit 36.

The frequency setting circuit 36 generates a clock signal whose frequency is changed according to the change Δf and outputs it to the driving-pulse generating circuit 26.

Accordingly, by performing feedback control so that the phase difference φ between the A-phase driving control signal and the vibration-detection signal becomes the reference phase difference φref, it is possible to drive the ultrasonic actuator 10 at a desired driving frequency according to the detected electrical signal for the longitudinal vibration from the internal electrodes 14(C+) and 14(C−) of the ultrasonic vibrator 4.

Figure 16:
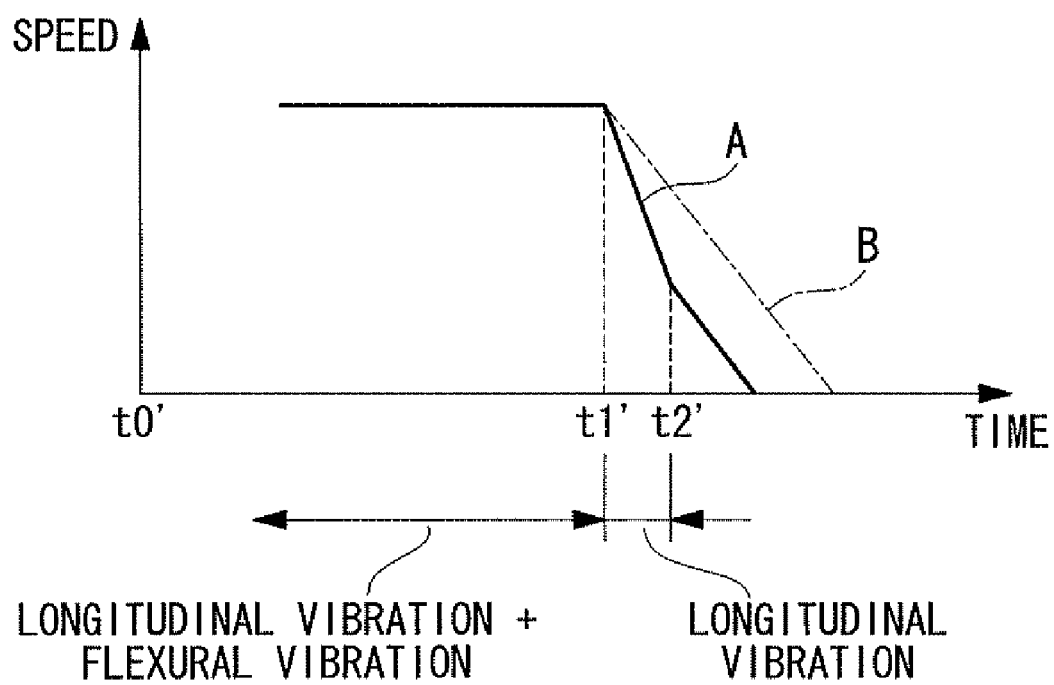
FIG. 16 is a diagram showing the relationship between vibration excitation time and moving speed of the driven body, when driving of the ultrasonic actuator according to an embodiment of the present invention is stopped.

Next, when stopping the driving of the ultrasonic actuator 10, the driving device 8 excites only the longitudinal vibration in the ultrasonic vibrator 4 for a prescribed period, as shown in FIG. 16, and then stops driving the ultrasonic vibrator 4.

In FIG. 16, the horizontal axis indicates time and the vertical axis indicates the moving speed of the driven body 2. In this embodiment, at t1', the flexural vibration is stopped and only the longitudinal vibration is excited, and at t2', the driving signals are stopped.

More concretely, when stopping driving of the ultrasonic actuator 10, two-phase driving control signals with prescribed driving frequencies and the same phase are input to the drive IC 28 from the driving-pulse generating circuit 26. Accordingly, two-phase AC driving voltages with the same phase and prescribed driving frequencies are respectively applied to the A-phase external electrodes 22(A+) and 22(A−) and the B-phase external electrodes 22(B+) and 22(B−) of the ultrasonic vibrator 4. Thus, the flexural vibration generated in the ultrasonic vibrator 4 decreases, and only the longitudinal vibration is excited. As a result, the elliptical vibration generated in the friction-contact members 18 reduces from that shown in FIG. 15B to that shown in FIG. 15A, and rising of the ultrasonic vibrator 4 is reduced.

Accordingly, the friction between the driven body 2 and the ultrasonic vibrator 4 increases, which reduces the motion of the driven body 2. By expanding and contracting in the direction of motion due to the longitudinal vibration excited in the ultrasonic vibrator 4, the inertial force acting on the driven body 2 is reduced. Thus, in this state, the motion of the driven body is stopped by stopping the A-phase driving control signal and the B-phase driving control signal.

As a result, because the motion of the driven body 2 is stopped while the frictional force is applied to the driven body 2 and the inertial force of the driven body 2 is reduced (see the solid line A in FIG. 16), it is possible to shorten the stopping time compared with a case where the driving signals are stopped while generating the elliptical vibration composed of the longitudinal vibration and the flexural vibration (see the one-dot chain line B in FIG. 16).

As described above, with the ultrasonic actuator 10 according to this embodiment, at activation time, it is possible to prevent the driven body 2 from falling and to eliminate unstable motion of the driven body 2; and when stopping driving, it is possible to shorten the time for the driven body 2 to stop moving.

In this embodiment, the A-phase driving control signal and the vibration-detection signal are compared; however, it is possible to use the B-phase driving control signal instead of the A-phase driving control signal. In this case, it is necessary to change the reference phase difference φref according to the phase difference θ between the A-phase driving control signal and the B-phase driving control signal. In addition, instead of the two-phase driving control signals, it is possible to use either one of the two-phase AC driving voltages applied to the ultrasonic vibrator 4 from the drive IC 28.

Although an embodiment of the present invention have been described above with reference to the drawings, the actual configuration is not limited to this embodiment; the present invention also encompasses various design modifications so long as they do not depart from the spirit of the invention.

For example, in this embodiment, the longitudinal vibration and the flexural vibration are excited in the ultrasonic vibrator 4 by applying driving control signals with different phases to the A-phase electrodes and the B-phase electrodes. Instead of this, however, the ultrasonic vibrator may include electrodes specifically for inducing a longitudinal vibration and electrodes specifically for inducing a flexural vibration, and the longitudinal vibration and the flexural vibration may be excited in the ultrasonic vibrator. By doing so, it is possible to change the oscillating speed of the longitudinal vibration and the oscillating speed of the flexural vibration. As a result, in an ultrasonic actuator in which the driven body is moved by a combination of a longitudinal vibration and a flexural vibration, because the moving speed of the driven body is uniquely determined by the oscillating speed of the longitudinal vibration, it is possible to control the moving speed of the driven body by changing the oscillating speed of the flexural vibration.

What is claimed is:

1. A driving method for a standing-wave-type ultrasonic actuator in which, by generating a longitudinal vibration and a flexural vibration in an ultrasonic vibrator, a substantially elliptical vibration is produced at an output end of the ultrasonic vibrator, and with a frictional force of the elliptical vibration serving as a propulsive force, the ultrasonic vibrator and a driven body in contact with the ultrasonic vibrator are made to move relative to each other, the method comprising:

exciting the longitudinal vibration at activation time, and exciting the flexural vibration thereafter.

2. A driving method for a standing-wave-type ultrasonic actuator in which, by generating a longitudinal vibration and a flexural vibration in an ultrasonic vibrator, a substantially elliptical vibration is produced at an output end of the ultrasonic vibrator, and with a frictional force of the elliptical vibration serving as a propulsive force, the ultrasonic vibrator and a driven body in contact with the ultrasonic vibrator are made to move relative to each other, the method comprising:

stopping the flexural vibration when driving is to be stopped, and stopping the longitudinal vibration thereafter.

3. A driving device for a standing-wave-type ultrasonic actuator in which, by generating a longitudinal vibration and a flexural vibration in an ultrasonic vibrator, a substantially elliptical vibration is produced at an output end of the ultrasonic vibrator, and with a frictional force of the elliptical vibration serving as a propulsive force, the ultrasonic vibrator and a driven body in contact with the ultrasonic vibrator are made to move relative to each other, wherein the driving device excites the longitudinal vibration at activation time, and excites the flexural vibration thereafter.

4. A driving device for a standing-wave-type ultrasonic actuator in which, by generating a longitudinal vibration and a flexural vibration in an ultrasonic vibrator, a substantially elliptical vibration is produced at an output end of the ultrasonic vibrator, and with a frictional force of the elliptical vibration serving as a propulsive force, the ultrasonic vibrator and a driven body in contact with the ultrasonic vibrator are made to move relative to each other, wherein the flexural vibration is stopped when the driving is to be stopped, and the longitudinal vibration is stopped thereafter.

5. A standing-wave-type ultrasonic actuator system comprising:
a standing-wave-type ultrasonic actuator; and
a driving device for a standing-wave-type ultrasonic actuator according to claim 3.

6. A standing-wave-type ultrasonic actuator system comprising:
a standing-wave-type ultrasonic actuator; and
a driving device for a standing-wave-type ultrasonic actuator according to claim 4.

* * * * *